Figure 8:
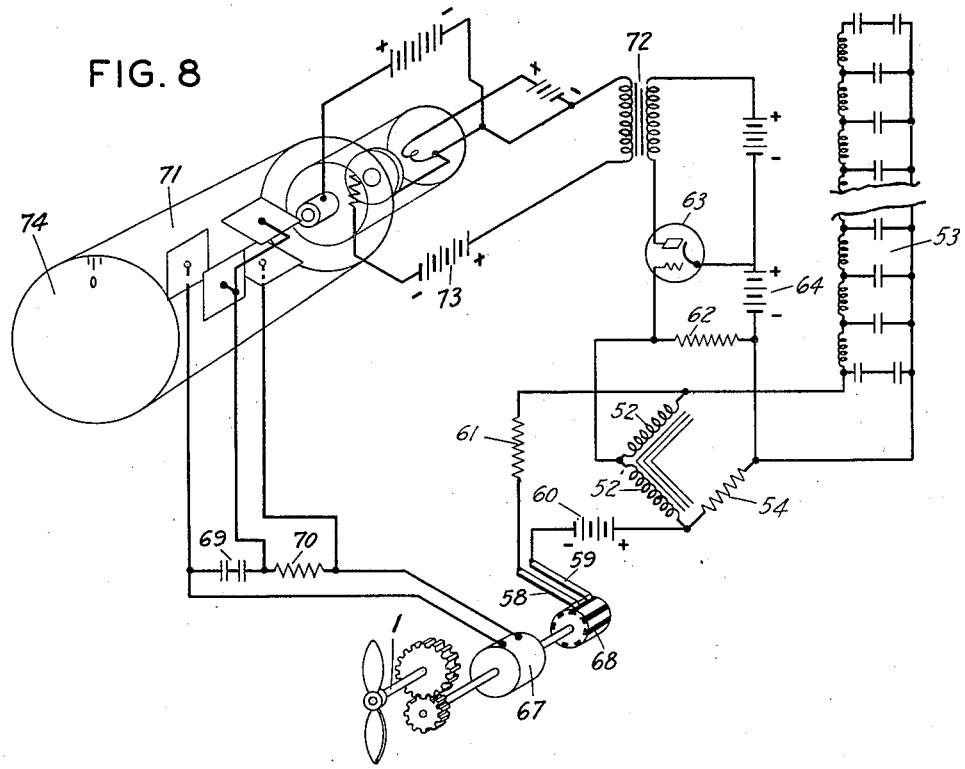

Feb. 16, 1937.  H. A. SATTERLEE  2,070,623
APPARATUS FOR THE MEASUREMENT OF ROTATIONAL VELOCITIES
Filed April 19, 1934   3 Sheets-Sheet 1
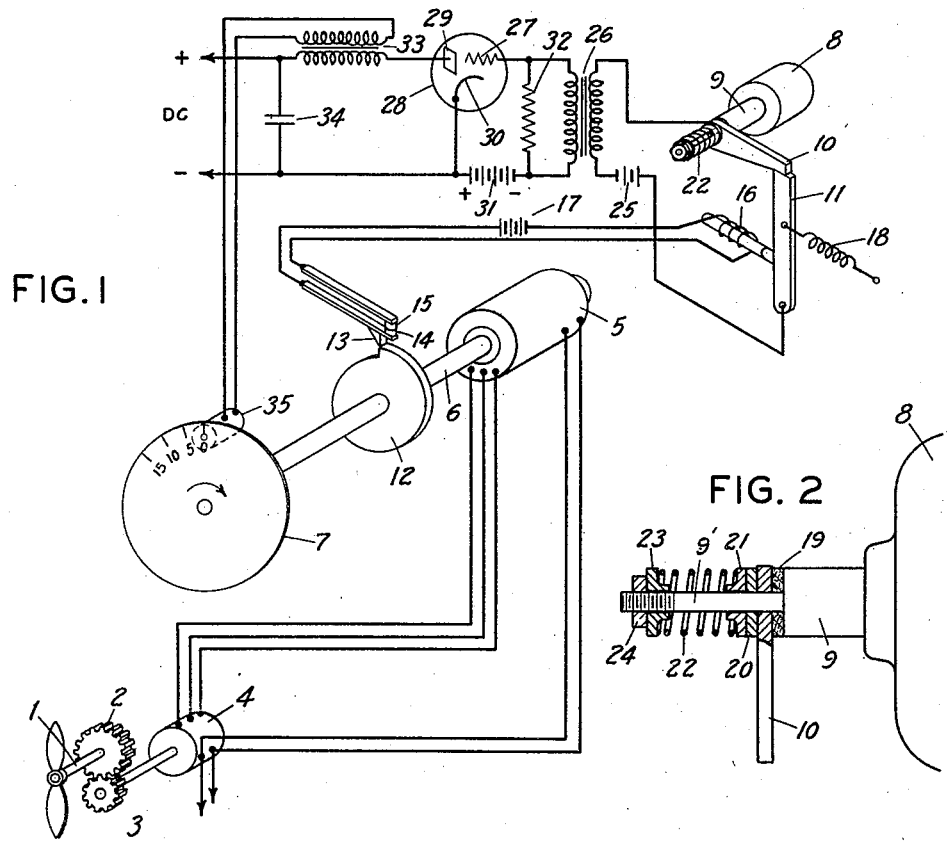
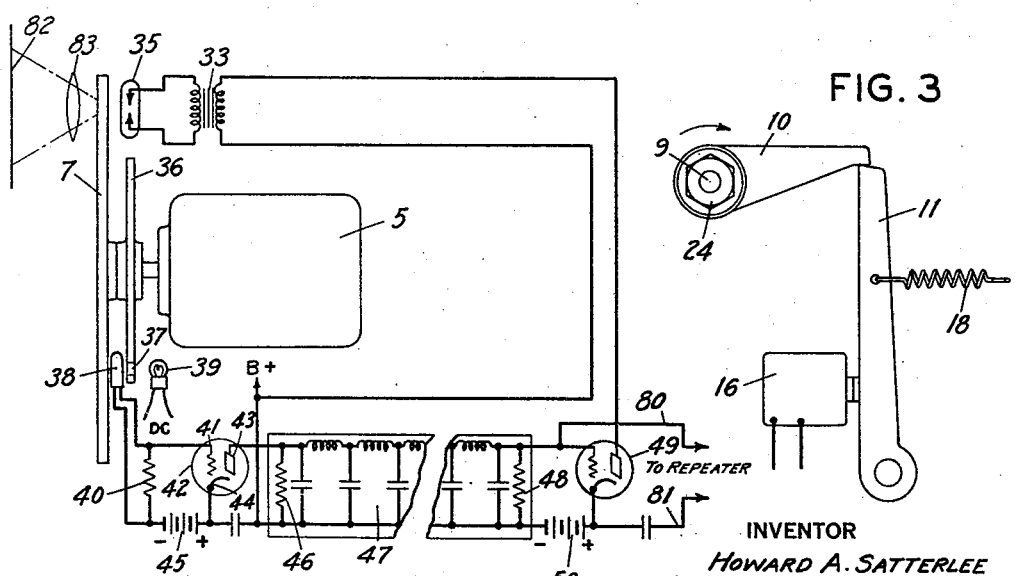
INVENTOR
HOWARD A. SATTERLEE
BY
ATTORNEY

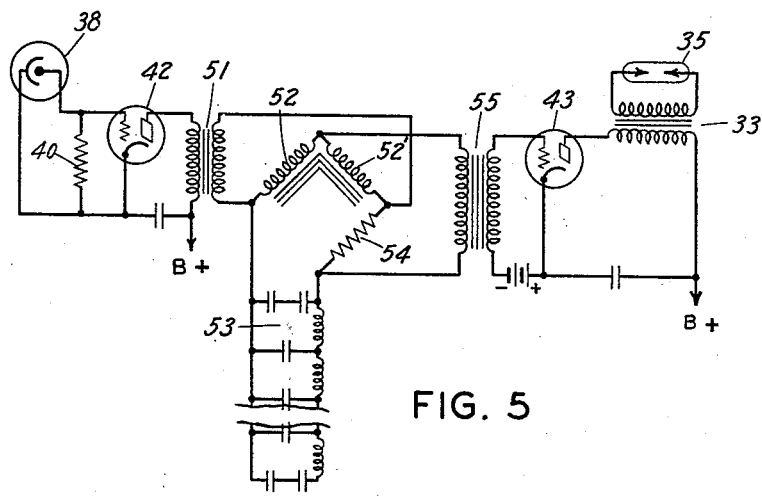
FIG. 5
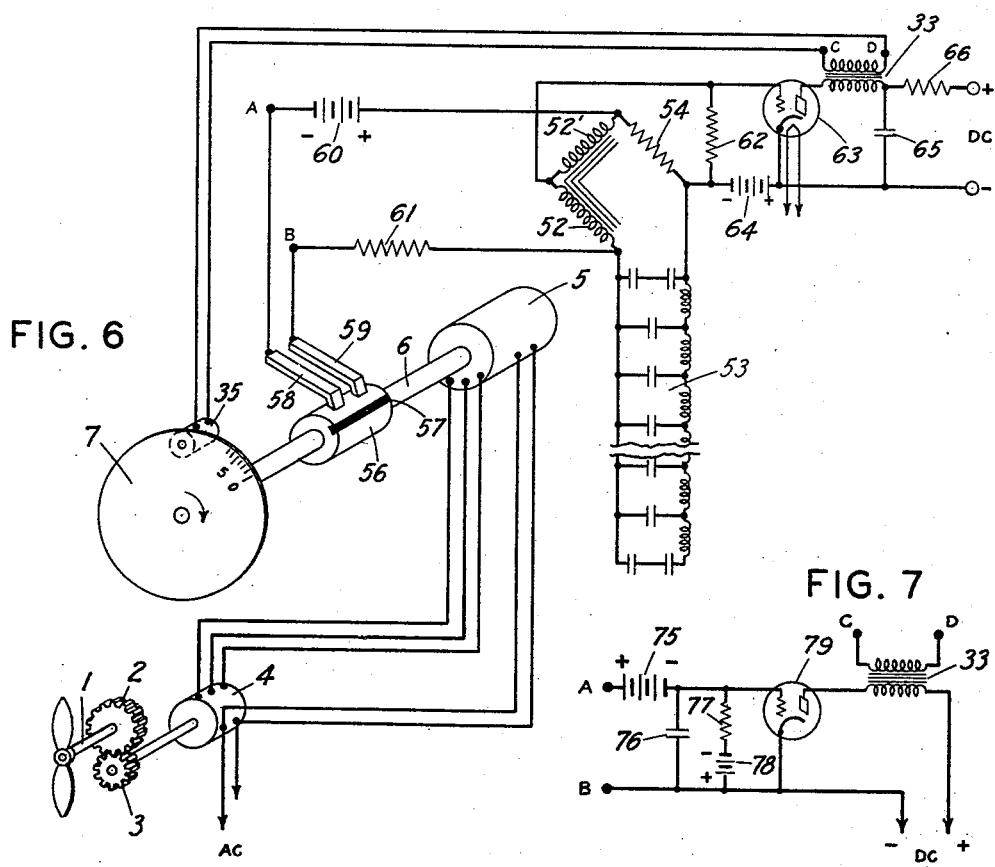
FIG. 6
FIG. 7
INVENTOR
HOWARD A. SATTERLEE
BY
Ezekiel Wolf
ATTORNEY Feb. 16, 1937.  H. A. SATTERLEE  2,070,623
APPARATUS FOR THE MEASUREMENT OF ROTATIONAL VELOCITIES
Filed April 19, 1934  3 Sheets-Sheet 3

INVENTOR
HOWARD A. SATTERLEE
BY
Ezekiel Wolf
ATTORNEY

Patented Feb. 16, 1937

2,070,623

UNITED STATES PATENT OFFICE 2,070,623

APPARATUS FOR THE MEASUREMENT OF ROTATIONAL VELOCITIES

Howard Avery Satterlee, Needham, Mass., assignor to Submarine Signal Company, Boston, Mass., a corporation of Maine Application April 19, 1934, Serial No. 721,334

22 Claims. (Cl. 175—183)

The present invention relates to apparatus for measuring and indicating the velocity of a rotating shaft. The present invention has particular application to instances where considerable accuracy is required and particularly to the indication of the speed of propeller shafts on ships and consequently also for the indication of the speed and distance traversed by ships.

Various methods are available for the measurement of the speed of rotating shafts. These methods are sufficient in many cases where only a small degree of accuracy is required. Where considerable accuracy is necessary, the problem is much more difficult and no apparatus has been commercially available which produces the required accuracy and at the same time gives an indication of the shaft speed substantially instantaneously. Arrangements have been used heretofore to indicate propeller shaft speeds, but these have been integrating devices which indicate substantially the average speed over a time interval of considerable length such as one minute. Furthermore, these devices have been quite complicated and expensive to manufacture.

The present invention provides an improved apparatus for measuring propeller shaft speed substantially instantaneously, the apparatus being relatively cheap to manufacture and easy to install and maintain in adjustment. In general the method according to my invention comprises rotating an index at a rate proportional to the velocity to be measured and indicating the angle through which the index moves during a predetermined time interval.

The invention may be better understood by reference to the accompanying drawings in which Fig. 1 illustrates an apparatus according to the present invention; Figs. 2 and 3 illustrate details of the apparatus shown in Fig. 1; Fig. 4 shows a modification of the system shown in Fig. 1; Fig. 5 shows a modification of the arrangement shown in Fig. 4; Fig. 6 shows a further modification of Fig. 4; Fig. 7 shows a modification of the time-interval measuring element; and Fig. 8 shows a modification of the indicating element.

In the following description and in the drawings the invention is described particularly as applied to propeller-shaft speed indicating apparatus but it is to be understood that it may be applied to the measurement and indication of the speed of any rotating device.

In Fig. 1 the propeller shaft whose speed is to be measured and indicated is shown at 1 and is geared by means of gears 2 and 3 to a Selsyn generator 4. The latter produces an electric current to rotate synchronously a Selsyn motor 5. This motor through shaft 6 rotates an index in the form of a translucent scale 7 at a speed proportional to the speed of the propeller shaft 1. Also mounted upon the shaft 6 and rotated thereby is a cam 12 upon which bears a rider 13 which, when the cam 12 reaches a predetermined position, drops abruptly and opens contacts 14, 15, thereby opening the circuit of an electromagnet 16 energized by the battery 17.

An independent constant speed motor 8 rotates a shaft 9 at a predetermined rate. Frictionally coupled to the shaft 9 is an arm 10 of light mass making electrical contact with the stop 11 which is held in its illustrated position by the electromagnet 16 and prevents the rotation of the arm 10. When the electromagnet 16 is deenergized by the opening of contacts 14, 15, the spring 18 draws the member 11 away from beneath the arm 10. The latter under the influence of the motor 8 immediately begins a rotation at the motor speed. Before the arm 10 has completed a full revolution, the cam 12 will have moved sufficiently to close again the contacts 14, 15, thereby reenergizing the magnet 16 which attracts the arm 11 to bring the latter again into position to stop the further rotation of the arm 10 when it has completed a full revolution. Details of the arrangements of the arm 10 and the stop 11 are shown in Figs. 2 and 3.

As shown in Fig. 2 the shaft 9 has a reduced portion 9' on which is mounted a felt thrust washer 19, the arm 10 and a bronze bearing washer 20. A collar 21 is thrust against the bronze washer 20 by a spring 22 secured to the shaft by collar 23 and nut 24. The motor 8 is sufficiently powerful to maintain substantially the same speed both at no load and with the frictional load imposed when the arm 10 is held by the stop 11. The arm 10 is the timing element of the system. Great accuracy in its time of rotation may be obtained by choice of a suitable motor 8 so that it will maintain a constant speed at all times.

The arm 10 and the stop 11 when in contact close a series circuit containing the battery 25 and the primary of transformer 26. The secondary of the transformer 26 is connected to the grid 27 of the vacuum tube 28 which is also provided with plate and cathode elements 29 and 30, respectively. The other end of the secondary of transformer 26 is connected to the negative side of the battery 31. A resistance 32 is also connected across the secondary of transformer 26. In the plate circuit of the tube 28 there is connected the primary of a step-up transformer 33 in series with a direct current source whose negative side is connected back to the cathode 30. A condenser 34 is shunted between the transformer 33 and the cathode 30. The secondary of transformer 33 is connected to the two elements of a discharge tube, preferably a neon tube, 35.

The operation of the system is as follows: When the scale 7 reaches a position where its zero mark is opposite the neon tube 35, the cam 12 simultaneously reaches a position at which the contacts 14, 15 open, deenergizing the magnet 16 and permitting spring 18 to pull stop 11 away from the arm 10. The latter immediately commences rotation under the influence of motor 8. Before it has rotated a complete revolution contacts 14, 15 are again closed and the stop 11 pulled by the magnet 16 back into its original position. When the arm 10 completes a full revolution, it makes contact with the stop 11 and energizes the primary of transformer 26, thereby inducing an impulse in the secondary of this transformer and placing a positive impulse upon the grid 27.

This permits current to flow in the plate circuit of the tube 28 through the primary of transformer 33, thereby inducing a high potential in the secondary of transformer 33 and causing a discharge to take place in the neon tube 35. In the time taken by the arm 10 to make a complete revolution, the scale 7 will have moved through an angle proportional to the angle through which the shaft 1 has turned. Since the scale 7 has moved this distance in a definite predetermined time interval, its angular displacement is proportional to the speed of shaft 1 and consequently the scale 7 may be calibrated directly in revolutions per minute and the speed of the shaft 1 is determined by the position of the scale 7 when the neon tube 35 discharges. The scale 7 and the neon tube 35 are mounted in a cabinet in such a manner that the scale is invisible except when illuminated momentarily by the neon tube 35.

A system of this type is comparatively cheap to manufacture and is very accurate if the speed of the arm 10 be kept within reasonable limits. It is preferable, however, to keep the speed of the arm 10 very low. For this reason if the speed of the shaft 1 which is to be measured is high, an indication cannot be readily obtained for each revolution of the shaft 1 and the indications can most accurately be repeated at a rate of the order of ten per second.

Modifications of this system in which the number of mechanical moving parts are reduced and in which a much greater number of indications may be obtained in a given time are shown in the subsequent figures.

In Fig. 4 the Selsyn motor driven by current from the generator coupled to the shaft whose speed is to be measured is indicated at 5. Mounted on the shaft of the motor 5 are a translucent scale 7 and an opaque disk 36 provided with an aperture 37. The scale and disk 36 are thus rotated at a speed proportional to that of the shaft whose speed is to be measured. On one side of the disk 36 is positioned a photo-electric cell 38 which is energized by the light source 39 once in each revolution of the disk 36 when the aperture 37 comes in line with the photo-electric cell and the light source. The photo-electric cell 38 is connected across a resistance 40 and on one side to the grid 41 of the vacuum tube 42 while the other side is connected through the biasing battery 45 to the cathode 44. The anode-cathode circuit of the vacuum tube 42 is connected across a resistance 46 forming the input of an electric retardation line 47 terminated by the resistance 48. The retardation line 47 is suitably proportioned to retard an electric impulse passing through it by a predetermined time interval. The output end of the retardation line is connected to the grid of the vacuum tube 49 normally biased negative by the battery 50.

The plate circuit of this vacuum tube is connected to the primary of transformer 33. The secondary of this transformer is connected to the two electrodes of the neon discharge tube 35. One or more vacuum tubes with associated transformers and neon tubes may be connected in parallel with the vacuum tube 49 to operate repeaters in various locations, as indicated by the leads 80 and 81.

The markings on scale 7 may be projected greatly enlarged upon screen 82 by lens 83, resulting in a much smaller instrument.

The operation of the arrangement just described is as follows: When the zero mark of the scale 7 is opposite the neon tube 35, the aperture 37 is also opposite the photo-electric cell 38 and the source of light 39, thereby producing an electric impulse which is impressed upon the vacuum tube 42 and causes a current impulse to flow through the retardation line 47. A predetermined time later the impulse will reach the input circuit of the vacuum tube 49 and by overcoming the negative bias on the grid provided by the battery 50 will cause a current impulse to flow in the plate circuit of the tube 49 including the primary of transformer 33. A high-voltage impulse is thereupon induced in the secondary of transformer 33, effecting a discharge of the neon tube 35 and momentarily illuminating the scale 7. Similarly as in the modification shown in Fig. 1, the angular distance through which the scale 7 has moved during the time interval required for the impulse produced by the photo-electric cell 38 to traverse the retardation line and actuate the discharge tube 35 is a measure of the speed of the shaft whose rate of rotation is being determined.

It will be observed that with the modification shown in Fig. 4 the scale 7 may be arranged to rotate at a relatively high speed so that indications may be produced over substantially the entire range of speeds to be measured at a rate of sixteen or more indications per second. A substantially continuous indication of the speed of the shaft is thereby obtained and, furthermore, the measurement is substantially an instantaneous measurement of the speed.

Fig. 5 illustrates a modification of the time-measuring circuit shown in Fig. 4. The photo-electric cell and the first vacuum tube are given the same numbers as those in Fig. 4. The anode-cathode circuit of the vacuum tube 42 in Fig. 5 is connected across the primary of transformer 51. The secondary of transformer 51 is connected across opposite corners of a bridge circuit. Two arms of the bridge are formed by the inductances 52 ant 52' wound upon the same core and of equal value. The inductance of these coils is made large compared with the inductance of the transformer 51. A third arm of the bridge is formed by the retardation line 53 and the fourth arm by the impedance 54 matched to the impedance of the line 53. The secondary of transformer 51 is connected across the two bridge arms containing the retardation line 53 and the impedance 54. The two opposite terminals of the bridge, namely the junction of the inductances 52 and 52' and the junction of the impedance 54 with the lag line 53, are connected across the primary of transformer 55 whose secondary is connected across the input of vacuum tube 49 having in its anode circuit the transformer 33 and the neon tube 35 similarly as in Fig. 4.

In the operation of Fig. 5 the impulse produced by the photo-cell 38 passes through transformer 51 and is impressed upon the retardation line 53. The impulse does not pass through the coils 52, 52' since their inductance is large compared with that of the transformer 51.

The impulse passes through the retardation line 53 in Fig. 5 which is not loaded at the end but is left open-circuited so that the impulse is reflected back over the line. After reflection it is impressed upon the primary of transformer 55, and through the vacuum tube 43 and transformer 33 operates momentarily the neon tube 35. This modification has some advantages over that shown in Fig. 4, particularly in that a smaller retardation line is required to produce a predetermined time delay between the initiation of the impulse and the subsequent discharge of the neon tube.

A further modification of Fig. 4 is shown in Fig. 6. In this figure the photo-electric cell is eliminated and a contact device is provided to initiate an electric impulse when the scale 7 reaches its zero position. This comprises a commutator 56 mounted on the same shaft with the scale 7. The commutator 56 is insulated except for the conducting segment 57. The brushes 58 and 59 bear upon the commutator and are connected by the conducting segment 57 when it passes beneath them. In series with the brushes 58 and 59 are a battery 60 and a current-limiting resistance 61 and two opposite terminals of the retardation line bridge circuit similar to that shown in Fig. 5. The opposite terminals of the bridge circuit are connected across a resistance 62 and the input of a thyratron 63. The thyratron has its grid biased negatively by the battery 64. The negative biasing potential is overcome by the impulse and produces a current flow of large intensity in the anode-cathode circuit of the thyratron 63 which contains the discharge tube transformer 33.

A condenser 65 and resistance 66 may advantageously be provided to control the duration of current flow in the anode-cathode circuit of tube 63 and thereby to control the time during which the neon tube 35 remains illuminated. The operation of this modification is similar to that described above with reference to Fig. 5 except that the initial impulse is provided by the battery 60 when the brushes 58, 59 are short-circuited by the commutator 56 and the final impulse for operating the discharge tube 35 is produced by means of a thyratron instead of a vacuum tube. It is to be understood, however, that a vacuum tube may be used in the modification shown in Fig. 6 if desired, and likewise that a thyratron may be used in corresponding places in the other modifications.

Instead of employing an electric retardation line for the time-measuring element, the time required for a condenser to charge or discharge may be used. Such an arrangement is shown in Fig. 7. The timing circuit within the terminals A, B, C, D in Fig. 6 may, for example, be removed and the circuit shown in Fig. 7 connected in its place. With this arrangement the short-circuiting of brushes 58 and 59 closes the circuit containing the constant voltage battery 75 charging the condenser 76. After the brushes leave the conducting segment 57, the charging circuit is opened and the condenser 76 commences to discharge through the resistance 77 which is in series with battery 78. The battery 78 normally provides a negative potential on the grid of tube 79, thus normally preventing any flow of plate current in this tube.

The voltage on condenser 76, however, is larger than that provided by the battery 78 and accordingly the grid of tube 79 is immediately made positive, permitting plate current to flow in the anode-cathode circuit containing the primary of the transformer 33. The neon tube 35 is accordingly illuminated. Subsequently when the condenser 76 is discharged to a point where the grid of tube 79 again becomes negative cutting off the plate current flowing through the primary of transformer 33, there is again produced an illumination of the neon tube 35. Since the condenser 76 was initially charged to a known and constant voltage, its time of discharge to the voltage of battery 78 will be a constant and therefore the angular deviation of the scale 7 from its position at the moment the brushes 58, 59 left the segment 57 is in each case a measure of the speed of the shaft 1. It should be noted that if the circuit shown in Fig. 7 is used, the position of the conducting segment 57 on the commutator must be changed somewhat from that shown in Fig. 6 so that the brushes 58, 59 will be short-circuited a few degrees before the zero mark on the scale and will leave the conducting segment precisely at the zero mark on the scale in order that proper timing may result.

The different form of indicating device to be used in place of the rotating scale and neon tube shown in the preceding modifications is described in Fig. 8. According to this modification the shaft 1 whose speed is to be measured is through suitable gearing coupled to an alternating current generator 67 and a commutator 68. The generator 67 produces single-phase current of a suitable frequency which is conducted through a phase-splitting arrangement including the condenser 69 and resistance 70 to the two sets of control plates of a cathode-ray tube 71. The potential so applied to the control plates produces an electrostatic field tending to rotate the cathode-ray beam at the same period as that of the current produced by the generator 67. The commutator 68 upon which bear the brushes 58 and 59 is provided with a sufficient number of conducting segments to short-circuit the brushes once for every cycle of the alternating current produced by generator 67. The brushes 58 and 59, when short-circuited by commutator bar, close a circuit to produce an electric impulse impressed upon a retardation line in a manner similar to that shown in Fig. 6. After reflection and amplification the impulse produces a potential in the secondary of the transformer 72 which is connected to the grid and the cathode of the cathode-ray tube 71. Normally the grid of the cathode-ray tube is negatively biased by the battery 73, thereby preventing the electron beam from passing through the anode to the fluorescent screen 74 at the end of the tube.

When, however, an impulse has passed through the retardation line and the transformer 72, the negative potential provided by the battery 73 is overcome and the grid of the cathode-ray tube becomes positive, permitting the electron beam to pass through the anode and between the control plates to the screen 74. The screen 74 is provided with a suitable scale which may be calibrated directly in terms of the speed of the shaft 1. It will be evident that if the brushes 58 and 59 are properly positioned on the commutator 68 with respect to the instantaneous potential developed by the generator 67, an impulse will be sent into the retardation line at the instant the potential on the control plates of the cathode-ray tube is such as to direct the cathode-ray beam, if it were then permitted to pass the grid, against the screen adjacent to the zero mark of the scale. Subsequently when the impulse finally reaches the grid of the cathode-ray tube and thereby permits the cathode-ray beam to pass to the screen, the potential on the control plates will have changed in such a manner as to deflect the cathode-ray beam on to the screen at a point angularly removed from the zero point by an amount proportional to the angular velocity of the shaft 1.

The term rotating index as used in the claims is intended to comprehend a rotating scale, a rotating or vertically rotating cathode-ray beam or other equivalent arrangement such as a rotating pointer. Obviously also in the cases where a scale and electric discharge indicator such as a neon tube are employed, the discharge indicator may be rotated and the scale maintained stationary without departing from the principles of my invention.

Having now described my invention, I claim:

1. In a rotational velocity measuring system, means for indicating the end of a predetermined time interval after the happening of an event comprising means for creating an electric impulse at the happening of the event, an electric retardation line, means for impressing said impulse upon said line, means at the end of the line for creating an amplified impulse and an indicator operable by said impulse.

2. A device for measuring a variable rotational velocity including an index, means for rotating the same continuously at a velocity proportional to the velocity to be measured, means for creating an electric impulse at the instant said index passes a fixed reference point, an electric timing circuit operated by said impulse for creating a second electric impulse a predetermined time interval after the creation of the first and means responsive to said second impulse for indicating the instantaneous position of said index.

3. A device for measuring a variable rotational velocity including an index, means for rotating the same continuously at a velocity proportional to the velocity to be measured, time-delay means, means for creating an electric impulse at a predetermined position of said index for initiating the operation of said time-delay means, means including said time-delay means for creating an electric impulse after the operation of the time-delay means and means responsive to said second impulse for indicating the instantaneous position of said index.

4. A device for measuring a variable rotational velocity including an index, means for rotating the same continuously at a velocity proportional to the velocity to be measured, an electric retardation line having a predetermined time length, means for creating an electric impulse and impressing the same upon said line at the instant said index reaches a predetermined position and means responsive to said impulse after it has passed through said line for indicating the instantaneous position of said index.

5. A device according to claim 4 in which said indicating means is an electric discharge tube adapted to become luminous when energized by said impulse.

6. A device according to claim 4 in which said index is a disc having translucent scaler markings thereon and said indicating means is an electric discharge tube adapted to become luminous when energized by said impulse and positioned in proximity to said scale whereby said scale is momentarily illuminated.

7. A rotational velocity measuring system comprising means adapted to be rotated at a speed proportional to the velocity to be measured, means for creating an electric impulse at the instant said rotatable means passes through a predetermined angular position, an electric retardation line of predetermined constant line length, means for impressing the impulse upon said line and means responsive to said impulse after its passage through the line and cooperating with said first-named means for indicating the momentary position of the latter when said impulse emerges from said retardation line.

8. A rotational velocity measuring system comprising means adapted to be rotated at a speed proportional to the velocity to be measured, a commutator adapted to be rotated at said proportional speed, an electric circuit including a power source, means cooperating with said commutator adapted to close said circuit momentarily at the instant said rotatable means passes through a predetermined angular position, an electric retardation line having a predetermined constant time length, means for connecting the line to said circuit and electrically operated indicating means cooperating with said first-named means and connected to the output end of said line.

9. A shaft speed measuring system including means for creating an electric impulse at a predetermined angular position of the shaft, an electric retardation line having a constant predetermined time length, an indicating device, and means for impressing said impulse upon said line and for impressing the reflection thereof from the end of the line upon said indicating device including a bridge circuit having two equal series-connected inductances each forming one arm of the bridge, the third arm being formed by said retardation line and the fourth by an impedance matching the impedance of the line, said impulse being impressed across the extremities of the series-connected inductances and said indicator being connected across the junction of said two inductances and the junction of said impedance and the line.

10. A system for measuring a rotational velocity comprising means adapted to be rotated at a speed proportional to the velocity to be measured, means for creating an electric impulse at the instant said rotatable means passes through a predetermined angular position, and means including an electric retardation line and a cathode ray tube for indicating the angular deviation of said rotatable means a predetermined time interval after the creation of said impulse.

11. A system for measuring a rotational velocity comprising means adapted to be rotated at a speed proportional to the velocity to be measured, means for creating an electric impulse at the instant said rotatable means passes through a predetermined angular position, an electric retardation line, means for impressing said impulse upon said line and means including a cathode ray tube cooperating with said first-named means for indicating the arrival of the impulse at the output end of said line.

12. A system for measuring a rotational velocity including a cathode ray tube having a cathode, an anode and control plate electrodes and a fluorescent screen at the end of the tube, a scale associated with said screen, means including said control plates for creating within said tube in the path of the cathode ray, an electric field rotating continuously at a period proportional to the velocity to be measured, and means for influencing the cathode ray at a definite time interval after said field attains a predetermined vector magnitude to indicate on the screen the instantaneous position of the ray under the influence of said field.

13. A device for measuring a variable rotational velocity including an index, means for rotating the same continuously at a velocity proportional to the velocity to be measured, a photo-electric cell adapted to produce an electric impulse the instant said index passes a fixed point, an electric retardation line having a predetermined time length, means for impressing said impulse upon said line and means responsive to said impulse after it has passed through said line for indicating the instantaneous position of said index.

14. A device for measuring a variable rotational velocity including an index, means for rotating said index continuously at a velocity proportional to the velocity to be measured, a photoelectric cell adapted to produce an electric impulse the instant said index passes a fixed point, an electric retardation line having a predetermined time length, means for impressing said impulse upon said line, an electric discharge tube indicator for indicating, when energized, the instantaneous position of said index and means responsive to said impulse after it has passed through said line for energizing said indicator.

15. A system for measuring the speed of a rotating shaft comprising a synchronous electric generator driven by said shaft, a synchronous electric motor driven by the current from said generator, a disk having translucent scaler markings thereon driven by said motor, means for producing when energized an intense momentary illumination behind said disk in proximity to said markings, means operated by said motor for producing an electric impulse at the instant said disk passes a fixed reference point in each revolution of the disk, an electric retardation line having a predetermined time length, means for impressing said impulse on said line and means responsive to said impulse after it has passed through said line for operating said momentary illumination producing means.

16. In a shaft speed measuring system, means for indicating the end of a predetermined time interval after said shaft passes through a predetermined angular position, comprising means for creating an electric impulse at the instant said shaft passes through said position, an electric retardation line, means for impressing said impulse upon said line and indicating means at the output end of the line operable by said impulse.

17. A shaft speed measuring system including means for creating an electric impulse at a predetermined angular position of the shaft and means including an electric retardation line and an indicating device for indicating the angular deviation of said shaft at a predetermined time interval after the creation of said impulse.

18. In a system for measuring the speed of a rotating shaft, means for indicating for each revolution of said shaft a predetermined time interval after said shaft passes through a predetermined angular position, comprising means for creating a short electric impulse at each instant said shaft passes through said position, an electric retardation line, means for impressing said impulse upon said line and indicating means at the output end of the line operable by said impulse.

19. A system for measuring the speed of a rotating shaft including a self-synchronous electric generator driven by said shaft, a self-synchronous electric motor operatively connected to said generator, means for creating an electric impulse at the instant said shaft is in a definite angular position and means including an electric retardation line for indicating the position of the rotor of said motor a predetermined time interval after the production of said impulse.

20. A system for measuring the speed of a rotating body including means for creating an electric impulse at the instant said body passes through a predetermined position, an electric timing circuit operated by said impulse for creating a second electric impulse a predetermined time interval after the creation of the first and means responsive to said second impulse for indicating the average rotational speed of said body during said time interval.

21. A system for measuring the speed of a rotating body including time delay means adapted to operate within a constant time interval, means for creating an electric impulse at a predetermined position of said body for initiating the operation of said time delay means, means including said time delay means for creating an electric impulse after the operation of the time delay means and means responsive to said second impulse for indicating the average rotational speed of said body during said timing interval.

22. A system for measuring the speed of a rotating body including an electric timing circuit adapted to supply an electric impulse a predetermined time interval after its energization, circuit closing means adapted to be operated when said body passes through a predetermined position and when so operated to energize said timing circuit and means responsive to said impulse for indicating the average rotational speed of said body during said time interval.

HOWARD AVERY SATTERLEE.

CERTIFICATE OF CORRECTION.

Patent No. 2,070,623.　　　　　　　　　　　　　　　　February 16, 1937.

HOWARD AVERY SATTERLEE.

It is hereby certified that error appears in the printed specification of the above numbered patent requiring correction as follows: Page 4, second column, line 8, claim 6, and page 5, first column, line 48, claim 15, for "scaler" read scalar; page 4, second column, line 20, claim 7, for "line" second occurrence, read time; and that the said Letters Patent should be read with these corrections therein that the same may conform to the record of the case in the Patent Office.

Signed and sealed this 12th day of October, A. D. 1937.

(Seal)　　　　　　　　　　　　　　　　　　　　Henry Van Arsdale.
　　　　　　　　　　　　　　　　　　　　Acting Commissioner of Patents.